F. W. HARLOW.
Hay Loader.
No. 91,623. Patented June 22, 1869.
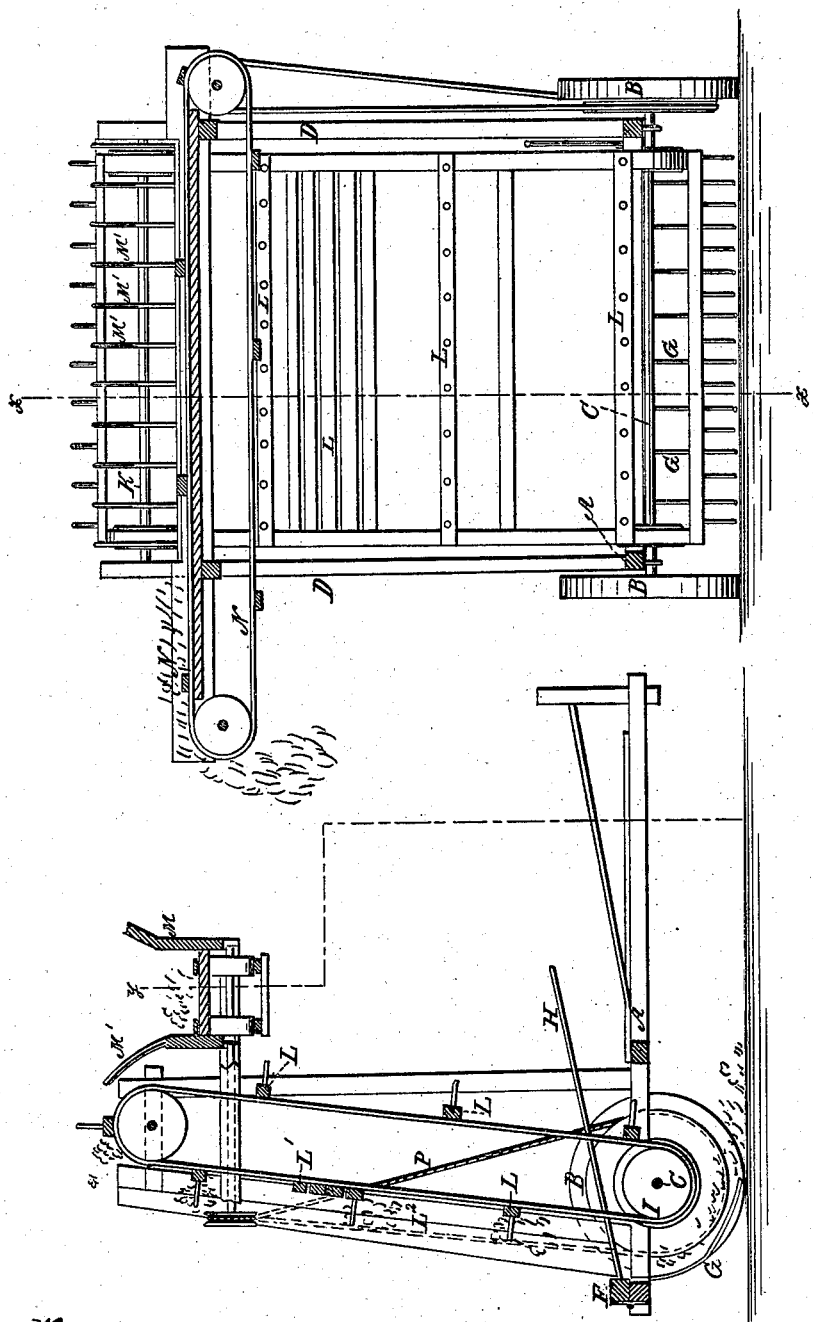

United States Patent Office.

F. W. HARLOW, OF HANNIBAL, MISSOURI.

Letters Patent No. 91,623, dated June 22, 1869.

---

IMPROVEMENT IN HAY-RAKERS AND LOADERS.

---

The Schedule referred to in these Letters Patent and making part of the same.

---

*To all whom it may concern:*

Be it known that I, F. W. HARLOW, of Hannibal, in the county of Marion, and State of Missouri, have invented a new and improved Hay-Loader; and I do hereby declare that the following is a full, clear, and exact description thereof, which will enable others skilled in the art to make and use the same, reference being had to the accompanying drawing, forming part of this specification.

This invention relates to improvements in hay-loading apparatus, designed to provide a simple and efficient machine for the purpose; and It consists in the peculiar arrangement of the parts of the same, as will be hereinafter more fully described.

Figure 1 represents a sectional elevation of my improved apparatus, taken on the line $x-x$ of fig. 2, and Figure 2 represents a sectional elevation on the line $y-y$ of fig. 1.

Similar letters of reference indicate corresponding parts.

I provide a truck, A, supported on the wheels B, and an axle, C, having an elevated frame, D, and so arranged as to be fastened to the wagon, near the front, and drawn along the side thereof.

Upon the rear end of the frame, I hinge a rake-head, E, having curved steel-wire teeth G, which gather the hay under the axle.

The said rake is also provided with an operating-handle, H, for directing or regulating it.

Upon pulleys I, on the shaft C, and corresponding pulleys upon a transverse shaft, K, at the top of the frame D, I arrange the belts or chains of an elevator, of which L are transverse rakes, so arranged, relatively to the rake-teeth, that when they sweep around the pulleys I at the bottom, they will gather the hay therefrom and carry it to the top, where they will deliver it to a trough, M, having a carrier, N, in it, moving transversely along the head of the elevator, and delivering the hay to the load.

The said carrier is operated by a belt, P, from a wheel on the shaft C, and consists of a pair of belts or chains, working over suitable pulleys at each end, and connected by cross-bars. Any suitable arrangement of carrier may, however, be used.

In advance of each rake-head L, on the elevator, I propose to arrange any preferred number of wood bars $L^1$, to prevent the hay from falling off the said rake-heads; and I also propose to employ side-guards $L^2$, preferably made of strong canvas, to confine the hay at the ends of the rake-heads.

The side of the trough M is provided with bent fingers, M', arranged to pass between the fingers of the rake-heads L, and take therefrom the hay as the said rake-heads pass over the upper pulleys.

When chains are employed for the elevators, I propose to make the wheels over which they work, with flat facets on the periphery, corresponding in length to the links of the chains.

One of the wheels B may, if preferred, be arranged to work loosely on the shaft C, to facilitate turning around curves.

A clutch may be provided on the driving-axle, to gear and ungear the elevator when required.

Having thus described my invention,

What I claim as new, and desire to secure by Letters Patent, is—

The arrangement of the truck A and elevator-frame D, supported upon the axle C, bearing the wheels B, the hinged rake F G, the rake-elevator and carrier, the trough M, guards M', and the endless carrier N, as herein described, for the purpose specified.

F. W. HARLOW.

Witnesses:
 WM. H. FENNER,
 H. C. BRYANT.